Dec. 12, 1961    R. A. MOSHER ET AL    3,012,507
SHAPED AMMONIUM NITRATE PROPELLANT
Filed May 20, 1958    2 Sheets-Sheet 1
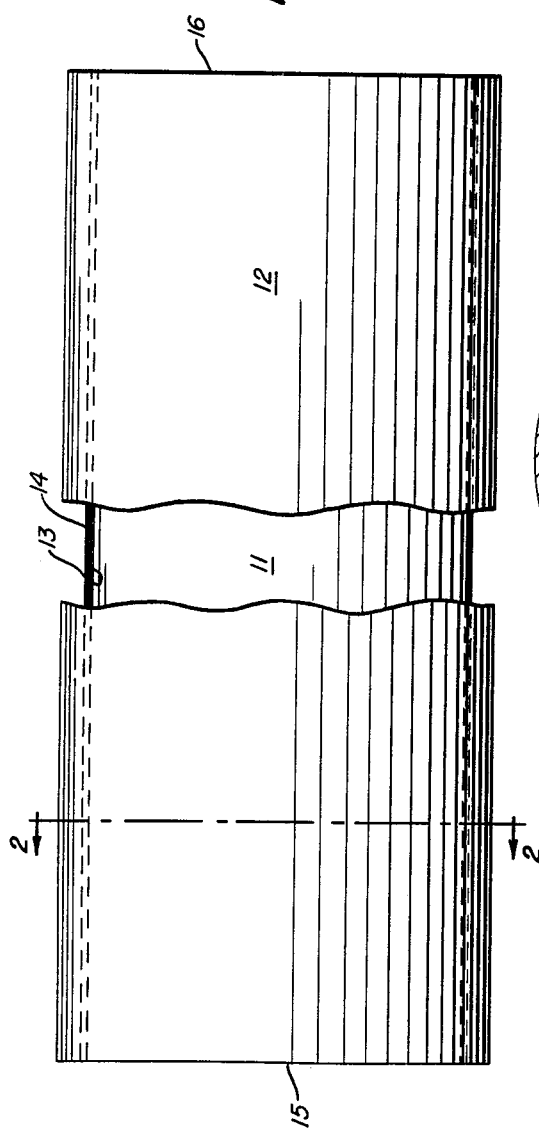
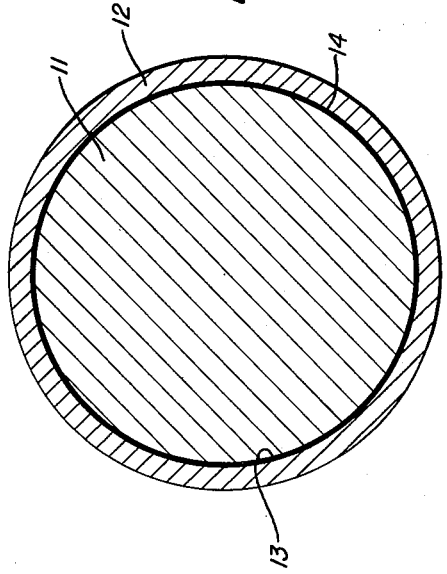
INVENTORS:
Robert A. Mosher
William G. Stanley
BY
*Michael Dufner*
ATTORNEY

United States Patent Office 3,012,507
Patented Dec. 12, 1961

3,012,507
SHAPED AMMONIUM NITRATE PROPELLANT
Robert A. Mosher and William G. Stanley, Seymour, Ind., assignors to Standard Oil Company, Chicago, Ill., a corporation of Indiana
Filed May 20, 1958, Ser. No. 737,186
6 Claims. (Cl. 102—98)

This invention relates to ammonium nitrate base solid propellants provided with a restrictor coating over a portion of the propellant body.

A rocket motor and a gas generator have the common requirement namely, that the gas produced in the motor and the generator must be produced at a substantially uniform rate and uniform pressure. The pressure within the motor or gas generator may be determined within limits for the particular gas producing material by the gas exit orifice size or the valve portion. On the other hand the uniform rate of gas production is much more difficult to attain. In order to attain a substantially uniform rate of gas generation it is necessary to utilize a particular type of configuration for the gas generating composition and to control the burning area of the composition. Unless very special precautions are taken all surfaces of the gas generating composition present in the combustion zone will burn. In solid propellants even the narrowest of fissures will result in two burning surfaces, i.e., one on each side of the fissure. To illustrate a solid propellant composition in a cylindrical configuration cannot be fitted so tightly against the wall of the combustion chamber that burning of the cylinder surface is prevented, that is, in the absence of some special precaution a cylindrical grain would burn at both ends and the cylindrical surface.

A uniform rate of burning or a controlled change in rate of burning is attained by applying a relatively non-combustible coating to the surface of the propellant body where direct burning is to be prevented. This coating is commonly referred to as a restrictor or combustion restrictor. The requirements for satisfactory restrictors are stringent. In the first instance the restrictor must adhere to the surface of the solid propellant body. Also, the restrictor must be substantially non-porous; the presence of pores or holes in the coat results in combustion of the solid propellant at that point with resultant variation in the gas production rate. Also the restrictor must not develop fissures or cracks under prolonged storage conditions. It is an ordinary military requirement that solid propellants be able to withstand repeated changes of temperature from as much as —70° F. to as much as +170° F. without changing the ambient gas production rate.

Certain polymeric materials containing active amino groups make excellent restrictors under ordinary conditions, however, in the course of aging the adhesion between the restrictor and the propellant body loosens and the effectiveness of the restrictor is destroyed. The active amino groups may be present in polymers wherein one of the reactants is an amine or amide; or the active amino groups may come from the presence of catalyst or curing agents.

An object of the invention is an ammonium nitrate type solid propellant body provided with a restrictor coating over a portion thereof, which restrictor coating contains active amino groups. Other objects will become apparent in the course of the detailed description of the invention.

FIGURE 1 shows a partially blocked view of a cylindrical propellant provided with an undercoating and a restrictor coating on the cylindrical surface.

FIGURE 2 is a section through FIGURE 1 at 2—2.

Figure 3:
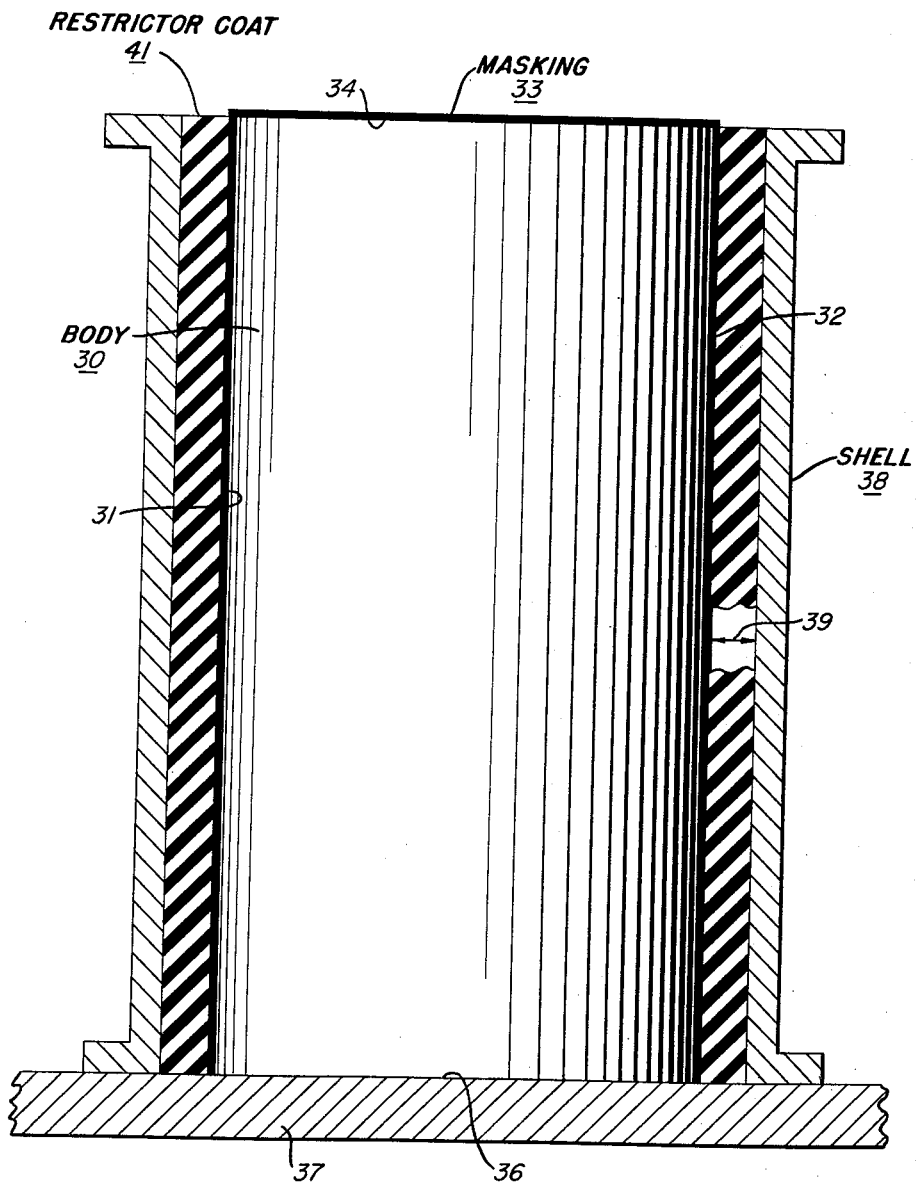
FIGURE 3 shows a partial sectional view of one embodiment of the propellant of the invention positioned in a shell wherein the restrictor coating was applied.

It has been discovered that active amino groups slowly react with ammonium nitrate present in the ammonium nitrate propellant body portion and create non-adhering spots which defeat the purpose of the restrictor coating. This reaction is eliminated by providing an undercoating adhered to the body portion and adapted to seal the body portion so that the restrictor coating adhered to the undercoating cannot contact ammonium nitrate.

The solid propellant of the invention comprises a shaped body portion formed of ammonium nitrate as the major component, and an oxidizable binder therefor. This body portion may be any of the configurations commonly used for gas generator purposes or rocket propulsion purposes. For example, a simple cylinder, a tube, a cylinder positioned within a tube, various cruciforms, internal star shaped openings with various types of external surfaces, particularly cylindrical, etc. The restrictor is positioned immediately contiguous to that part of the surface of the propellant body where direct burning is to be prevented. For example, in a tubular grain the annular ends may be coated with a restrictor in order to force the burning to be on the exterior and internal cylindrical surfaces only. In another instance only a particular area of a body portion may be coated with a restrictor to provide a very short term control of burning area; for example, it may be necessary to have all surface burning but immediately after ignition, pressure surges must be avoided and this is done by restricting only a small portion of the body to control burning for maybe one half second and at the end of that time the restrictor coating will be removed by the combustion gases. The undercoating which seals the ammonium nitrate surface is positioned on that portion of the surface of the body which is to be coated with the restrictor.

The undercoating is a material capable of adhering firmly to the surface of the ammonium nitrate body portion and also capable of forming an adhesion bond with the restrictor coating material. Also, the undercoating must be sufficiently impervious to seal the surface and bar access of the restrictor coat to said surface. In those cases where the restrictor coating is applied by potting the undercoated grain using a liquid reaction mixture to provide the restrictor coating, the undercoating must be essentially insoluble in the liquid reaction mixture. The undercoating is generally in itself not suitable for use as a restrictor material and therefore is applied in a thickness just enough to provide the necessary sealing effect. The thickness is dependent upon the particular undercoat forming material and may be from $\frac{1}{100}$ inch to on the order of $\frac{1}{32}$ inch. In those cases where the undecoat material is sufficiently flexible to act as a restrictor a thicker coating may be used.

Many different classes of materials may be used as undercoat formers. Materials which form a dense, hard resinous sheet are particularly suitable. Illustrative materials are: the resinous reaction product of p enol and formaldehyde; the resinous reaction product of urea and formaldehyde; the polyvinyl resins such as polyvinyl acetate and polyvinyl formal; cellulose esters of lower alkanoic acids, particularly those plasticized with triaryl phosphates such as triphenyl phosphate and tricresyl phosphate; the copolymerization product of polyvinyl methyl ether and maleic anhydride; a copolymer of styrene and butadiene sold commercially as an adhesive. It is to be understood that this listing is illustrative only and does not include all the compounds affording the requirements for an undercoat for this purpose.

A material containing reactive amino groups is one wherein free "NH₂" or "NH" groups are present. Since the presence of even a small blister in the restrictor coating may cause failure of the restrictor coating and burning of the surface of the body portion at that point with consequent disruption of the desired burning pattern the presence of even minor amounts of unreacted amino groups is deleterious. The amino groups may be present as unreacted portion of reactants forming the restrictor coating or may be from amine catalyst or curing agents introduced into the restrictor coat forming material.

Three restrictor coating materials which are particularly benefited by the presence of an undercoating are described in considerable detail hereinafter. It is to be understood that this description of only three particularly benefited materials is not exclusive and the undercoating is applicable to any restrictor material containing even a small amount of unreacted amino groups.

The polyurethane restrictor coating of the invention is produced by slow setting reaction involving an aromatic diisocyanate, a saturated polyester having terminal hydroxyl groups and a molecular weight between about 600 and 3000 and a catalyst. The restrictor coating must be free of holes and thin spots therefore precautions should be taken to keep the reaction mixture essentially free of materials that produce foam by reaction with the isocyanate group. It is preferred to use a polyester which is essentially free of carboxyl groups for this reason. The isocyanate groups are present in an amount of at least the theoretical for reaction with the hydroxyl groups of the polyester; an excess is preferable and as much as 1.5 times the theoretical requirement may be used.

The catalyst used in the preparation of the polyurethane is a slow acting catalyst. A slow acting catalyst is necessary because the manner of producing a restrictor coating requires flow of the reaction mixture through narrow void spaces between the surface of the propellant body and the shell positioned at the portion of the body which is to be restricted. The thickness of the restrictor coating will be determined by the particular requirements. In general non-porous restrictors are obtained in coats as thin as 1/16 inch. It is usual to use a thicker restrictor coat and in general the coat will be between about 1/8 and 3/16 inch thick, circumstances may require coating 3/8 inch or more. It is to be understood that the restrictor coat should be no thicker than the requirements of the particular application since excess thickness of material results in uneconomic costs. In general it is preferred that the set time of the reaction mixture in a beaker containing about 100 grams of polyester of molecular weight about 1700 with 100 grams of tolylene diisocyanate (80:20 commercial mixture) and 1 gram of catalyst intermingled at 70–80° F. be at least about 30 minutes; the time being determined from the moment of adding the catalyst to the mixture of isocyanate compound and polyester and the moment when the material in the beaker is too thick to flow appreciably when the beaker is turned on its side. It is to be understood that the set time of the reaction mixture will be determined by the particular application; a long relatively wide void space may require a far slower setting mixture than a short thin void space. In general for ease in operation the catalyst type and usage will be determined to give a setting time only a few moments longer than the time needed for the reaction mixture to flow into the space farthest from the point of introduction of the liquid reaction mixture.

Suitable catalyst for the practice of the invention are selected from the class consisting of N-cocomorpholines, pyridines, quinolines, isoquinolines, and ethoxylated amines. The usage of catalyst is determined by the particular reactants and by the setting time requirements. The amount of catalyst, based on 100 parts by weight of polyester, may vary from as little as 0.1 or less to as much as 10 parts by weight. It is usual to use between about 1 part and 3 parts by weight.

The ethoxylated amines are available as commercial materials known as etha amines. These may be either the product of reaction with mono-amines, di-amines or mixtures thereof.

N-cocomorpholine itself is an excellent catalyst; substituted N-cocomorpholines may also be used.

In addition to pyridine, quinolines and isoquinoline per se various substituted members of these compounds are useful as catalysts in the process. The substituted pyridines may be the picolines, lutidines, or collidines. In addition to the pyridines etc. containing these simple lower alkyl substituents higher molecular weight alkyl substituents such as nonyl, dodecyl or pentadecyl may be present. In general one or more alkyl groups having from 1 to 15 carbon atoms may be present. Alkanol substituents wherein the group is joined to the ring through a carbon atom are suitable; one or more of these alkanol groups each having from 1 to 15 carbon atoms in the group may be present. Substituent(s) may be an alkaryl group or an aralkyl group. The substituent may be positioned on the ring at any point but it is preferred that the substituents be in a position to stericly hinder the nitrogen atom in the ring—especially suitable are substituents on the carbon atom(s) ortho to the nitrogen atom. In the case of pyridine it is preferred that the substituents be on the 2 and/or 6 positions.

The isocyanate affording compound contains at least two of these groups. The compound may be an aromatic diisocyanate such as tolylene diisocyanate, naphthalene diisocyanate, phenylene diisocyanate, diphenylmethane diisocyanate, triphenylmethane triisocyanate; substituted aromatic diisocyanates may be used such as methoxyphenylene diisocyanate, phenoxyphenylene diisocyanate, and chlorophenylene diisocyanate. The isocyanate affording compound may be a pre-polymer adduct such as the product of the reaction of tolylene diisocyanate with trimethyolpropane.

The hydroxyl group affording reactant is a saturated polyester terminated with hydroxyl groups and having a molecular weight between about 600 and 3000. The polyester condensation product of adipic acid and ethylene glycol is particularly suitable. The branched polyesters such as are derived from the reaction of adipic acid, ethylene glycol and some glycerol are also suitable. In addition to the polyesters the higher molecular weight ether glycols may also be used.

The epoxy resin utilized in the restrictor coating of the instant propellant is derived from the reaction of epichlorohydrin and a bisphenol. The bisphenols utilized may be bi-phenol, a substituted bi-phenol, particularly those containing alkyl substituents having from 1 to 4 carbon atoms, or complex bi-phenol ethers or the more complex bisphenols having alkyl group joining the two phenyl groups. A particularly suitable bisphenol reactant is 2,2′-bis-(p-hydroxyphenylpropane) which is commonly known as Bisphenol A. The particular epoxy resin produced from these reactants has an epoxide equivalent weight between about 165 and 215. The commercially available material derived from the reaction of epoxichlorohydrin and Bisphenol A and having an average epoxide equivalent weight of about 185 is particularly suitable. The term "epoxide equivalent weight" as used herein is in accord with the usage of Stivala in chapter 10 of "High Polymers" volume X, Schildknecht in Polymer Processes; Interscience Publishers Inc., 1956.

The liquid polymeric polyamide used as a reactant for the preparation of the resin reaction product is a reaction product of polyene fatty acids and aliphatic polyamines. This polyamide is one of the well known class of polymers whose method of preparation from polyene fatty acids and alkylene polyamines is described in U.S. 2,450,940. A particularly suitable class of polyamides is described in U.S. 2,705,223 at column 3. For the purposes of this invention the polyamides are liquid materials, i.e. materials which are liquid at temperatures below about 100° F. and preferably are liquid at ordinary atmospheric temperatures in the region of 30 to 75° F. In addition to being liquid materials the polyamides used in this invention have an amine number between about 165 and 215. The amine number is a measure of the free amine groups present in the polymer and is defined as the number of milligrams of potassium hydroxide equivalent to the free amine groups present in one gram of the polymer.

The third reactant present in the reaction mixture which produces the resin reaction product used as the restrictor as a polymethoxy acetal. The polymethoxy acetals have the formula:

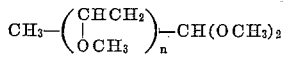

The acetals which are suitable for use herein are those where $n$ is an integer having an average value between 3 and 10. In general these acetals are available as mixtures of compounds and are sold on the basis of an average molecular weight as defined by the value of $n$. Those acetals wherein the average value of $n$ is 4 or 5 are particularly suitable.

In order to have a restrictor coating meet the particular requirements it is necessary that the proportions of the three reactions be controlled. Based on 100 parts of reaction mixture the parts by weight of each reactant present is as follows: the defined epoxy reactant between about 50 and 25; the defined liquid polyamide between about 15 and 65 and the defined acetal between about 35 and 10. To illustrate one end of the range of proportions contains said epoxy 50 parts, said polyamide 15 parts and said acetal 35 parts. At the other end of the range the proportions are said epoxy 25 parts, said polyamide 65 parts and said acetal 10 parts. The amount of each reactant present may be varied between these limits as required by the particular use and by the particular epoxy or polyamide or acetal used.

The epoxy reson was a commercial material which had an epoxide equivalent weight of 179–194 and is produced by the reaction of epichlorohydrin and Bisphenol A. The liquid polymeric polyamide was a commercial material having an amine number in the range of 290–320 and averaging about 305; this material is commonly known as Versamid 125. The polymethoxy acetal used has an average $n$ value of 4 and is available commercially as PMAC–5; this material is a condensation product of methylvinyl ether and methanol. In this test the reaction mixture consisted of 45 parts by weight of Versamid 125, 35 parts by weight of epoxy and 20 parts by weight of PMAC–5.

This particular mixture has a reaction time of about 6 hours prior to setting to a semi-solid material. In about 18–24 hours, dependent on atmospheric temperature, the reaction mixture sets to a hard tough solid. Prior to this the body portion which was to be restricted had been placed within a shell enclosing the cylindrical surface and spaced about 3/16 inch from the surface. The mixture of reactants at room temperature of about 80° F. was then poured into the space between the cylindrical surface of the body portion and the shell. In general it is best to bring the reactants, into contact with the surface to be restricted almost immediately after the final mixing of the reactants. However, there is an appreciable time before the initial setting of the reactants and some delay may be tolerated. It is observed that a fair temperature rise takes place during the setting of the resin reaction product. In this instant the solid propellant was permitted to set for 24 hours to allow for completion of the resin reaction. The shell was removed and the restrictor coating carefully inspected for bubbles and incomplete coverage of the surface. This procedure gives a complete coverage of the surface with a bubble free impervious resin coat.

Another restrictor is a reaction product of a hereinafter defined epoxy resin, a hereinafter defined liquid polysulfide polymer and a hereinafter defined polyalkylene polyamine. It has been found that in order to obtain the desired characteristics of the restrictor coating it is necessary to control not only the reactants but also the proportions of the reactants. Thus, the eqoxy resin and the polysulfide polymer are used in a weight rati between about 70:30 and 35:65, that is, when 70 parts by weight of epoxy resin are used, 30 parts by weight of polysulfide polymer will be used. The polyalkylene polyamine cross linking reactant is used in an amount between about 5 and 15 parts by weight per 100 parts of the other reactants, i.e. the sum of the epoxy resin plus polysulfide reactant. The particular proportions of epoxy resin and polysulfide polymer used and also the amount of polyamine used will be determined by the particular restricting requirement and also the particular reactant species used.

The epoxy resin utilized in the restrictor coating of the instant propellant is derived from the reaction of epichlorohydrin and a bisphenol. The bisphenols utilized may be bi-phenol, a substituted bi-phenol, particularly those containing alkyl substituents having from 1 to 4 carbon atoms, or complex bi-phenol ethers or the more complex bisphenols having alkyl group joining the two phenyl groups. A particularly suitable bisphenol reactant is 2,2'-bis-(p-hydroxyphenylpropane) which is commonly known as Bisphenol A. The particular epoxy resin produced from these reactants has an epoxide equivalent weight between about 165 and 215. The commercially available material derived from the reaction of epoxichlorohydrin and Bisphenol A and having an average epoxide equivalent weight of about 185 is particularly suitable. The term "epoxide equivalent weight" as used herein is in accord with the usage of Stivala in chapter 10 of "High Polymers" volume X, Schildknecht in Polymer Processes: Interscience Publishers Inc., 1956.

The liquid polysulfide polymer reactant has an average molecular weight on the order of 1000. This liquid polysulfide is derived from the reaction of alkali metal polysulfide, a dichloroethyl formal and a minor amount of trichloro-lower-alkane. The preparation and characteristics of these materials are set out by Fettes et al. at chapter XI of "High Polymers" volume X, Schildknecht in Polymer Processes; Interscience Publishers Inc., 1956. The commercially available liquid polysulfide polymer which is derived from the reaction of sodium polysulfide containing on the average of 2.25 sulfur atoms, bis(2-chloroethyl)formal and about 2 mol percent based on formal of trichloropropane is particularly suitable for use herein.

Restrictor coating meeting the requirements require the use of polyalkylene polyamine curing agents. These polyalkylene polyamines may be any one of those commonly used in the curing of epoxy resins. For example, polyalkylene polyamines usable herein include diethylene triamine, triethylene tetraamine, tetraethylene penta-amine, hexamethylene tetraamine, and the various polypropylene polyamines and polybutylene polyamines. Tetraethylene penta-amine is particularly suitable when working with the preferred commercially available epoxy resins and liquid polysulfide polymers set out above.

Particularly good results have been obtained with the above defined preferred epoxy resin, polysulfide polymer and tetraethylene penta-amine used in a weight ratio of epoxy to polysulfide of about 60:40 and penta-amine about 12 parts per 100 parts of epoxy plus polysulfide. Also particularly good results have been obtained using said epoxy and said polysulfide in about equal parts by weight and penta-amine in an amount of about 6 parts per 100 parts of epoxy plus polysulfide.

An epoxy resin purchased commercially which had an epoxide equivalent weight of 179–194 and is produced by the reaction of epichlorohydrin and Bisphenol A, was used as the epoxy reactant. The liquid polysulfide polymer was a commercial material produced by the reaction of sodium polysulfide containing an average of 2.25 atoms of sulfur, bis(2-chloroethyl)formal and 2% of trichloroopane based on formal. This polymer had a molecular weight of about 1000 and a viscosity of about 10 poises 25° C. The polyamine curing agent was tetraethylene penta-amine. In this test 40 parts by weight of the polylfide polymer and 12 parts by weight of the penta-amine are mixed; this mixture was then mixed with 60 parts by weight of the epoxy resin. Prior to this the body portion which was to be restricted had been placed within a shell enclosing the cylindrical surface and spaced about 3/16 inch from the surface. The mixture of reactants at room temperature of about 80° F. was then poured into the space between the cylindrical surface of the body portion and the shell. In general, it is best to bring the reactants into contact with the surface to be restricted most immediately after the final mixing of the reactants. However, there is an appreciable time before the initial setting of the reactants and some delay may be tolerated.

It is observed that a fair tmeperature rise takes place during the setting of the resin reaction product. In this instant the solid propellant was permitted to set overnight to allow for completion of the resin reaction. The shell was removed and the restrictor coating carefully inspected for bubbles and incomplete coverage of the surface. This procedure gives a complete coverage of the surface with a bubble free impervious resin coat.

The propellant body of the invention contains ammonium nitrate as the major component. The ammonium nitrate may be either C.P. or ordinary commercial ammonium nitrate such as is used for fertilizers. This commercial grade material contains a small amount of impurities and the particles are usually coated with moisture resisting material such as paraffin wax. Military grade ammonium nitrate which is almost chemically pure is particularly suitable. The ammonium nitrate is preferably in a finely divided particulate form which may be either produced by prilling or by grinding. The ammonium nitrate is the major component of the gas-generator composition and usually the composition will contain between about 65 and 80% of ammonium nitrate.

In order to permit the shaping of the ammonium nitrate composition to definite configurations a matrix former or binder material is present. When ammonium nitrate decomposes free-oxygen is formed. Advantage of the existence of this free-oxygen is taken and oxidizable organic materials are used as the binders. These oxidizable organic materials may contain only carbon and hydrogen, for example, high molecular weight hydrocarbons such as asphalts or residuums, and rubbers either natural or synthetic. Or, the oxidizable organic material may contain other elements in addition to carbon and hydrogen for example, Thiokol Rubber and Neoprene. The stoichiometry of the composition is improved, with respect to smoke production by the use of oxygenated organic material as the binders. The binder or matrix former may be a single compound such as a rubber or asphalt or it may be a mixture of compounds. The mixtures are particularly suitable when special characteristics are to be imparted to the grain which cannot be obtained by the use of a single compound.

The multi-component binder or matrix former commonly consists of a polymeric base material and a plasticizer therefor. Particularly suitable polymeric base materials are cellulose esters of alkanoic acids containing from 2 to 4 carbon atoms such as cellulose acetate, cellulose acetate butyrate and cellulose propionate; the polyvinyl resins such as polyvinylchloride and polyvinyl acetate are also good bases; acrylonitrile is good; styrene-acrylonitrile is an example of a copolymer which forms a good base material. In general the binder contains between about 15 and 45% of the particular polymeric base material.

The plasticizer component of the binder is broadly defined as an oxygenated hydrocarbon. The hydrocarbon base may be aliphatic or aromatic or may contain both forms. The oxygen may be present in the plasticizer in ether linkage and/or hydroxyl group and/or carboxyl groups; also the oxygen may be present in inorganic substituents particularly nitro groups. In general any plasticizer which is suitable for work with the defined polymers may be used in the invention. Exemplary classes of plasticizers which are suitable are set out below.

It is to be understood that these classes are illustrative only and do not limit the types of oxygenated hydrocarbons which may be used to plasticize the polymer.

Di-lower alkyl-phthalates, e.g. dimethyl phthalate, dibutyl phthalate dioctyl phthalate and dimethyl nitrophthalate.

Nitrobenzene, e.g. nitrobenzene, dinitrobenzene, nitrotoluene, dinitrotoluene, nitroxylene, and nitrodiphenyl.

Nitrodiphenyl ethers, e.g. nitrodiphenyl ether and 2,4-dinitrodiphenyl ether.

Tri-lower alkyl-citrates, e.g. triethyl citrate, tributyl citrate and triamyl citrate.

Acyl tri-lower alkyl-citrates where the acyl group contains 2–4 carbon atoms, e.g. acetyl triethyl citrate and acetyl tributyl citrate.

Glycerol-lower alkanoates, e.g. monoacetin, triacetin, glycerol, tri-propionate and glycerol tributyrate.

Lower alkylene-glycol-lower alkanoates wherein the glycol portion has a molecular weight below about 200, e.g. ethylene glycol diacetate, triethylene glycol dihexoate, triethylene glycol dioctoate, polyethylene glycol dioctoate, dipropylene glycol diacetate, nitromethyl propanediol diacetate, hydroxyethyl acetate and hydroxy propyl acetate (propylene glycol monoacetate).

Dinitrophenyl-lower alkyl-lower alkanoates, e.g. dinitrophenyl ethyl-acetate and dinitrophenyl amyloctoate.

Lower alkylene-glycols wherein the molecular weight is below about 200, e.g. diethylene glycol, polyethylene glycol (200), and tetrapropylene glycol.

Lower alkylene-glycol oxolates, e.g. diethylene glycol oxolate and polyethylene glycol (200) oxolate.

Lower alkylene-glycol maleates, e.g. ethylene glycol maleate and bis-(diethylene glycol monoethyl ether) maleate.

Lower alkylene-glycol diglycolates, e.g. ethylene glycol diglycolate and diethylene glycol diglycolate.

Miscellaneous diglycollates, e.g. dibutyl diglycollate, dimethylalkyl diglycollate and methylcarbitol diglycollate.

Lower alkyl-phthalyl-lower alkyl-glycollate, e.g. methyl phthalyl ethyl glycollate, ethyl phthalyl ethyl glycollate and butyl phthalyl butyl gycollate.

Di-lower alkyloxy-tetraglycol, e.g. dimethoxy tetra glycol and dibutoxy tetra glycol.

Nitrophenyl ether of lower alkylene glycols, e.g. dinitrophenyl ether of triethylene glycol and nitrophenyl ether of polypropylene glycol.

Nitrophenoxy alkanols wherein the alkanol portion is derived from glycol having a molecular weight of not more than about 200. These may be pure compounds or admixed with major component bis(nitrophenoxy)-alkane.

A single plasticizer may be used or more usually two or more plasticizers may be used in conjunction. The particular requirements with respect to use will determine not only the polymer but also the particular plasticizer or combination of plasticizers which are used.

In addition to the basic components, i.e. ammonium nitrate binder and catalyst, the gas generator propellant composition may contain other materials. For example, materials may be present to improve low temperature ignitability, for instance oximes may be present or, asphalt may be present. Surfactants may be present in order to improve the coating of the nitrate with the binder and to improve the shape characteristics of the composition.

Various burning rate promoters, which are not catalyst per se, may also be present.

The aromatic hydrocarbon amines are known to be gas evolution stabilization additives. Examples of these aromatic amines are toluene diamine, diphenyl amine, naphthalene diamine, and toluene triamine. In general the aromatic hydrocarbon amines are used in amounts between about 0.5 and 5 percent.

The mixture of ammonium nitrate, cellulose ester and oxygenated hydrocarbon is essentially as insensitive to shock as is ammonium nitrate itself. It is extremely difficult to get this particular mixture to burn. Smooth burning is attained by the addition of a catalyst to the mixture. This catalyst is distinguished from the well known sensitizers. For example, nitro starch or nitroglycerin may be added to ammonium nitrate in order to increase its sensitivity to shock and enable it to be more easily detonated for explosive use. Catalysts as a class do not promote sensitivity and are used to cause the ammonium nitrate composition to burn for example, like a cigarette. The effectiveness of the catalyst is in general measured by its ability to impart a finite burning rate to a cylindrical strand of ammonium nitrate composition. The burning rate is specified as inches per second at a given pressure and temperature; usually these burning rates are obtained by a bomb procedure operating at 1000 p.s.i. and about 75° F. temperature.

Many catalysts which promote the burning of ammonium nitrate compositions are known. The inorganic chromium salts form the best known classes of catalysts. The better known members of this class are ammonium chromate, ammonium polychromate, the alkali metal chromates and polychromates, chromic oxide, chromic nitrate, and copper chromite. Ammonium dichromate is the most commonly used chromium salt. Various hydrocarbon amine chromates such as ethylene diamine chromate and piperidine chromate are also excellent chromium catalyst. Certain heavy metal cyanides particularly those of cobalt, copper, lead, nickel, silver and zinc are effective catalysts. The cyanamides of barium, copper, lead, mercury and silver are effective catalysts. The various Prussian blues are excellent catalysts.

In addition to the above primarily inorganic catalysts various organic catalysts are known. The organic catalysts are particularly useful when it is desired to have combustion products which are gases or vapors and thereby do not erode gas exit orifices. Two catalysts which do not contain any metal components are pyrogene blue (Color Index 956-961) and methylene blue. Particularly suitable catalysts are the alkali metal barbiturates. Finely divided carbon such as carbon black present in amounts of several percent is effective alone as a catalyst, however, carbon is generally used in combination with another catalyst as a burning rate promoter.

One embodiment of the propellant of the invention is particularly described in FIGURES 1 and 2. The embodiment in these figures is a simple cylinder in shape; a multi-sided rod may also be treated in this same fashion. The ammonium nitrate propellant body is shown as 11. The restrictor coating 12 covers the cylindrical surface 13 of body 11. Undercoat 14 is adhered to surface 13 and in turn restrictor coat 12 is adhered to the outer surface of undercoat 14. Because of its restriction in this fashion the propellant of FIGURES 1 and 2 when placed in a rocket motor such as is shown for example, in FIGURE 2 of U.S. 2,539,404 and ignited at surface 16 will burn in cigarette fashion toward surface 15. Restrictor 12 prevents gases from igniting the cylindrical surface 13 of body 11; undercoating 14 is so thin that it would readily be melted or burned away by the hot gases tending to pass around the grain, if it is not gas-bonded.

It can be seen from FIGURES 1 and 2 that restrictor coating 12 must adhere tightly to undercoating 14 and undercoating 14 must adhere tightly to surface 13 to keep hot gases from passing beneath these coatings and igniting surface 13 beyond the perpendicular buring surface extending from face 16. Failure of the restriction in this type of burning produces a conical shaped burning surface which results in progressively increasing gas production rather than the desired uniform rate of gas products.

The thickness of the restrictor coating 11 will be determined by the particular requirements. In general nonporous restrictors are obtained in coats as thin as 1/64 of an inch. It is usual to use a thicker restrictor coat and in general the coat will be between about 1/16 and 1/4 inch thick. It is to be understood that the restrictor coat should be no thicker than the requirements of the particular application since excess thickness of material results in uneconomic costs.

FIGURE 3 sets out an illustrative embodiment wherein the restrictor coating is obtained by the use of potting technique. Potting technique can be used to apply restrictor coat not only to the entire surface as is shown in FIGURE 3 but also to selected portions of said surface by the use of suitable blanks.

In FIGURE 3 the ammonium nitrate propellant body 30 consists of a solid cylinder of ammonium nitrate base propellant. This body is to be restricted along the cylindrical surface so that the grain will when ignited burn cigarette fashion. The body 30 is provided with a masking 33 on end surface 34. The masking 33 may be any material which will protect surface 34 from contact with the polyurethane affording reaction mixture. The opposite surface 36 of body 30 may or may not be masked dependent upon the viscosity of the reaction mixture and the setting time with respect to the overall length of body 30.

Before body 30 is introduced into shell 38 undercoating 32 is applied to surface 31. In this embodiment undercoating 32 has been purposely exaggerated in thickness relative to the thickness of restrictor coating 41.

The masked body is positioned vertically on a flat surface 37, for example a metal plate. Shell 38 which is a tube having an internal diameter such that a void space 19 essentially equal to the thickness of the desired restrictor coating is provided when shell 38 is positioned on surface 37 about body 30. Shell 38 may be of any rigid material to which polyurethane does not readily adhere. Shell 38 should be of a rigidity great enough to provide a substantially uniform thickness of restrictor.

Restrictor coat 41 is obtained by pouring into void space 39 the desired polyurethane affording reaction mixture. When the restrictor coating has hardened enough to permit handling of the restricted body shell 38 is removed and masking 33 is also removed affording the finished restricted propellant.

One particular embodiment of the polyurethane affording reaction mixture consisted of 10 parts of a commercial mixture of tolylene diisocyanate isomers containing 80 percent of the 2,4-isomer and 20 percent of the 2,6-isomer. The polyester was a commercially available condensation reaction product of adipic acid and ethylene glycol; the polyester had a hydroxyl number of 65, an acid number of 1.5 and a Brookfield viscosity at 77° F. of 14000 centipoises and a molecular weight of close to 1700. One hundred parts by weight of the polyester was used. The catalyst in this particular embodiment consisted of 1 part by weight of N-cocomorpholine, which was added at room temperature of about 75° F. to the mixture of polyester and diisocyanate. This ratio of polyester and diisocyanate gives a slight excess of isocyanate groups over the hydroxyl groups and produces a tough, dense elastomer. This system has an exotherm upon the introduction of the catalyst and a setting time of 45 minutes. The reaction mixture was proportioned to fill a 3/16 inch void space about a solid cylinder of propellant 9 inches in diameter and 24 inches long. The potted propellant body was permitted to stand at room temperaure overnight and the shell was then removed.

Tests

Two series of tests were carried out on the effect of various undercoat forming materials with a polyurethane restrictor coating and an epoxy-polyamide restrictor coating. Sample blocks of the test ammonium nitrate body were coated with undercoating and then polyurethane coating applied by potting technique. The epoxy-polymide material was applied by brushing. In each instance restrictor coating was permitted to set for 24 hours before being tested for adhesion.

The body portion consisted of an ammonium nitrate composition as follows: cellulose acetate 12%, acetyl triethyl citrate 9%, 9% of a 2:1 mixture of dinitrophenoxyethanol and bis(dinitrophenoxy)ethane, carbon black 7%, toluene diamine 1%, sodium barbiturate catalyst 1% and ammonium nitrate 62%.

Series A: In this series the restrictor coating was obtained using as the reaction mixture 1 part of 2-ethanolpyridine, 10 parts of commercial 80/20 toluene diisocyanate mix and 100 parts of the polyester described hereinbefore.

The undercoatings were applied by brushing using the undercoat former dissolved in a solvent; the undercoat formers were either commercial preparations already in solution or were dissolved in the solvent set out in the annexed Table I. The polyurethane restrictor coating mixture was applied after allowing the undercoating to

TABLE 1

| Undercoat-Former | Polyurethane resin |
| --- | --- |
| No undercoat | Fair adhesion. |
| Pliobond Solution ᵃ (two coats) | Fair adhesion; Doesn't pull undercoat. |
| Polyvinyl methyl ether-maleic anhydride copolymer in methyl ethyl ketone. | Excellent adhesion; Doesn't pull undercoat. |
| Polyvinyl formal (two coats) | Do. |
| Cellulose acetate (9%) | |
| Tricresyl phosphate (1%) | Do. |
| Acetone (80%) | |
| Methyl alcohol (10%) | |
| Urea formaldehyde in butanol ethanol | Do. |
| Phenol formaldehyde in acetone | Do. |

ᵃ Styrene-butadiene copolymer.

dry overnight. After the 24 hour curing time the adhesion between the polyurethane and the undercoat and the adhesion of the undercoat and the ammonium nitrate body portion is tested by pulling on the restrictor coating. In the absence of an undercoat only fair adhesion was obtained between the polyurethane and the body portion. In the case of the undercoated bodies the adhesion between the undercoat and the polyurethane coat was determined as fair, good, or excellent; and the disruption of the bond between the undercoat and the propellant surface was determined as "pulls undercoat" or "doesn't pull undercoat." The results of this series are set out in Table 1 above.

Series B: In series B the propellant body had the same composition as that in series A. In this series the restrictor coating was an epoxy-polyamide resin prepared as described hereinbefore. In this case the reaction mixture consisted of epoxy resin 35%, polyamide resin 45%, and polymethoxy acetals 20%. In these tests a rough quantitative estimate of the bond strengths between ammonium nitrate body-undercoat and undercoat-restrictor was obtained. The bond strength between the undercoat and the propellant body was measured by forming a propellant body-undercoat sandwich and putting the sample in a device which permitted measuring fairly quantitatively the pounds per square inch tension required to break the sandwich. The tensile strength of the undercoat-restrictor system was measured by forming a 5 ply sandwich consisting of outer plies of propellant body inner plies of undercoating on the surface of each body and restrictor between the 2 layers of undercoat.

The tensile strength at 75° F. of the ammonium nitrate propellant body was in this test 500 p.s.i.

In a test to determine the adhesion of the restrictor of series B a sandwich consisting of 2 outer plies of propellant and an inner layer of restrictor was tested and found to have a tensile strength of 120 p.s.i.; the restrictor bond broke in the test.

A commercial phenol formaldehyde undercoating was applied and oven cured at 150° F. for one hour. The undercoat-propellant body strength was 320 p.s.i. with some pulling of the undercoat away from the propellant surface. The tensile strength of the restrictor of series B and this particular undercoating was very close to the same as that of the undercoat-propellant adhesion.

An undercoat consisting of cellulose acetate 90% and tricresyl phosphate 10% was applied to the surface oven cured at 150° F. for one hour. The undercoat-propellant bond strength was about 500 p.s.i. In testing the undercoat-restrictor adhesion the undercoat-restrictor bond broke at about 210 p.s.i.

An undercoat formed of polyvinyl chloride 90% and 10% tricresyl phosphate applied from acetone solution and cured at 150° F. had an undercoat-propellant bond of 165 ps.i.

Urea formaldehyde undercoat was applied from alcohol solution and cured at 150° F. The undercoat-propellant bond was 380 p.s.i.

A copolymer of polyvinylmethylether and maleic anhydride applied in acetone solution was cured overnight at room temperature to provide an undercoat, the bond strength of this undercoat-propellant material was 340 p.s.i.; this particular undercoat pulled some propellant with it when the break came.

Series C: Large grains about 9 inches in diameter and 20 inches long were tested using (a) phenol formaldehyde-polyurethane for coating (b) urea formaldehyde-polyurethane for coating and (c) polyvinylmethylether-maleic copolymer and the restrictor of series B for coating. These grains were given the temperature cycling test and were aged at 170° F. for some weeks without evidence of restrictor coat failure. These grains were given the proof test of a firing in the motor and showed perfect adhesion of the restrictor coating without faults by the production of a uniform pressure trace during firings of about 200 seconds.

Thus having described the invention, what is claimed is:

1. A solid propellant comprising a shaped body portion, formed of ammonium nitrate as the major component and an oxidizable binder therefor, the surface of said body being characterized by the presence of exposed ammonium nitrate which has not been covered by said binder, an undercoating adhered to and adapted to seal that part of the surface of said body where direct burning is to be prevented, whereby contact between said exposed nitrate and any material positioned on said undercoat is barred, and a combustion restrictor coating adhered to said undercoating, which restrictor is formed from a mixture consisting essentially of an aromatic diisocyanate and a saturated polyester having terminal hydroxyl groups and a molecular weight between about 600 and 3000, wherein between about 1 and 1.5 isocyanate groups are present per hydroxyl group, and a catalyst from the class consisting of N-cocomorpholines, pyridines, quinolines, isoquinolines, and ethoxylated amines, manitained on desired portion of said body for the time needed to form a substantially solid polyurethane restrictor coating.

2. The propellant of claim 1 wherein said diisocyanate is a tolylene diisocyanate and said polyester is a condensation reaction product of adipic acid and an ethylene glycol having a molecular weight of about 1700.

3. A solid propellant comprising a shaped body portion, formed of ammonium nitrate as the major component and an oxidizable binder therefor, the surface of said body being characterized by the presence of exposed ammonium nitrate which has not been covered by said binder, an undercoating adhered to and adapted to seal that part of the surface of said body where direct burning is to be prevented, whereby contact between said exposed nitrate and any material positioned on said undercoat is barred, and a combustion restrictor coating adhered to said undercoating, which restrictor is formed from the resin reaction product of (a) an epoxy resin having an epoxide equivalent weight between about 165 and 215 derived from epichlorohydrin and a bisphenol with (b) a liquid polymeric polyamide reaction product of polyene fatty acids and an aliphatic polyamine, said polyamide having an amine number between about 250 and 350 and with (c) a polymethoxy acetal having the formula

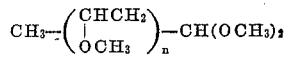

where $n$ is an integer having an average value between 3 and 10, said reactants having been present in said resin producing reaction mixtures, in parts by weight per 100 parts of reaction mixture, as follows: said epoxy between about 50 and 25, said polyamide between about 15 and 65, and said acetal between about 35 and 10.

4. The propellant of claim 3 wherein said epoxy resin has an epoxide equivalent weight of about 185 derived from epichlorohydrin and Bisphenol A, said polyamide has an amine number of about 305 and said acetal is the defined polymethoxy acetal wherein $n$ is 4, and the weight ratio of epoxy to polyamide to acetal is about 35:45:20.

5. A solid propellant comprising a shaped body portion, formed of ammonium nitrate as the major component and an oxidizable binder therefor, the surface of said body being characterized by the presence of exposed ammonium nitrate which has not been covered by said binder, an undercoating adhered to and adapted to seal that part of the surface of said body where direct burning is to be prevented whereby contact between said exposed nitrate and any material positioned on said undercoat is barred, and a combustion restrictor coating adhered to said undercoating, which restrictor is formed from the resin reaction product of (a) an epoxy resin having an epoxide equivalent weight between about 165 and 215 derived from epichlorohydrin and a bisphenol with (b) a liquid polysulfide polymer having an average molecular weight on the order of 1000 derived from alkali metal polysulfide, dichloroethyl formal and a minor amount of trichloro-lower-alkane, and with (c) a polyalkylene polyamine, the weight ratio of said epoxy to said polysulfide having been between about 70:30 and 35:65 and the amount of said polyamine having been between about 5 and 15 parts by weight per 100 parts of epoxy plus polysulfide reactants.

6. The propellant of claim 5 wherein said epoxy resin has an epoxide equivalent weight of about 185 derived from epichlorohydrin and Bisphenol A and said polysulfide polymer is derived from sodium polysulfide dechloroethyl formal and about 2 mol percent based on formal of trichloropropane and said weight ratio of epoxy to polysulfide is about 60:40 and tetraethylenepentamine is used in an amount of about 12 parts.

References Cited in the file of this patent

UNITED STATES PATENTS

| | | |
|---|---|---|
| 2,402,020 | Cislak et al. | June 11, 1946 |
| 2,539,404 | Crutchfield et al. | Jan. 30, 1951 |
| 2,549,005 | Preckel | Apr. 17, 1951 |
| 2,643,611 | Ball | June 30, 1953 |
| 2,780,996 | Hirsch | Feb. 12, 1957 |
| 2,783,138 | Parsons | Feb. 26, 1957 |

FOREIGN PATENTS

| | | |
|---|---|---|
| 632,733 | Great Britain | Dec. 5, 1949 |
| 655,585 | Great Britain | July 25, 1951 |

OTHER REFERENCES

Missiles and Rockets, vol. 2, No. 8, August 1957, Solid Fuel Industry Round-up, pages 67–73 and 85.

Chemical and Engineering News, Production, Oct. 7, 1957, pages 62 to 63.